United States Patent [19]

Czarnecki

[11] Patent Number: 4,736,670

[45] Date of Patent: Apr. 12, 1988

[54] REMOTELY OPERATED FLUID POWER CONTROL SYSTEM FOR AUTOMOTIVE VEHICLE

[75] Inventor: John A. Czarnecki, Rockwood, Mich.

[73] Assignee: Ford Motor Company, Dearborn, Mich.

[21] Appl. No.: 925,046

[22] Filed: Oct. 30, 1986

[51] Int. Cl.[4] .................. F15B 21/02; F16K 31/02; B60H 3/00
[52] U.S. Cl. ............................ 91/36; 91/356; 137/625.65; 251/129.11; 251/129.04; 165/42; 165/43
[58] Field of Search ............. 91/36, 356; 137/625.65; 251/129.11, 129.04; 165/42, 43

[56] References Cited

U.S. PATENT DOCUMENTS

| | | | |
|---|---|---|---|
| 3,983,930 | 10/1976 | Franz | 165/42 |
| 4,346,729 | 8/1982 | Franz | 165/42 |
| 4,408,278 | 10/1983 | Saito et al. | 165/42 |
| 4,485,863 | 12/1984 | Yoshida et al. | 165/42 |
| 4,503,888 | 3/1985 | Brovold | 137/625.65 |

Primary Examiner—Robert E. Garrett
Assistant Examiner—Thomas E. Denion
Attorney, Agent, or Firm—Jerome R. Drouillard; Roger L. May

[57] ABSTRACT

A remotely operated fluid power control system for an automotive vehicle includes a selector for selecting one of several desired operating modes for equipment connected to the fluid power control system and a remotely mounted actuator assembly for receiving electronic signals from the selector and for connecting the fluid power source to one or more fluid power systems. The selector and actuator assembly are connected by a single signal carrying device such as a cable.

13 Claims, 4 Drawing Sheets

REMOTELY OPERATED FLUID POWER CONTROL SYSTEM FOR AUTOMOTIVE VEHICLE

BACKGROUND OF THE INVENTION

1. Field of the Invention

This invention relates to a remotely operated fluid power control device for use with an automotive vehicle.

DISCLOSURE INFORMATION

Fluid power control devices have found wide usage in automotive vehicles, particularly in connection with so-called climate control systems, which comprise the heating, ventilation and air conditioning systems of such vehicles. Climate control systems commonly employed in automotive vehicles typically utilize one or more vacuum operated motors as prime movers for controlling various valves and air handling doors. These vacuum motors are operated by engine vacuum or from another vacuum source and offer a relatively dependable and simple means for permitting the climate control system to be shifted from one mode to another.

The vacuum motors included in any climate control system, or, for that matter, in any other system such as an automatic door locking system employing such motors, must be controlled by the use of selectively applied vacuum to the appropriate ports of the motor. One means for operating such motors in this manner is disclosed in U.S. Pat. Nos. 3,637,961; 3,942,555; and 4,126,153, each of which shows a linearly movable valve including a slide valve member which serves to selectively innerconnect the vacuum source with one or more ports operatively connected to a vacuum motor. Each of these valves is manually operable by means of a lever pivoted to the valve's body. Of course, if the valve is to be manually operated, the valve must be positioned in a location which is easily reachable by the operator of a vehicle. This, in turn, necessitates the connection of the valve to the various vacuum motors by means of an often bulky vacuum harness comprising many tubes bundled together at the control valve and running from the control valve to the various vacuum motors within the system. Fluid power control valves of this type are then, by necessity, rather bulky and of not insignificant size. This creates a host of problems for automotive designers wishing to package the control head for a climate control system within the limited confines of an automotive instrument panel. The present invention provides a solution for this problem by separating the control head from the valve itself and providing electronic means for remotely operating the valve by means of the control head.

The remotely operated fluid power control device of the present invention includes a motor driven valve bearing a modicum of similarity to valves which have been used with remotely operated valve mechanisms. Examples of remotely operated valve mechanisms are disclosed in U.S. Pat. Nos. 2,354,573; 3,363,536; 3,488,030; 3,586,027; and 3,756,282. Each of these patents discloses a valve and motor combination which functions to control the flow of a fluid through, or to, a single device. The present invention, on the other hand, has the capability not only to control the flow to a plurality of fluid power devices but also to operate a climate control system for a vehicle, where the climate control system has a plurality of operating modes.

It is an object of the present invention to provide a remotely operated fluid power control device for an automotive vehicle which allows a relatively small control head or selector means positioned upon the instrument panel of a motor vehicle to be connected by means of a cable or other remote connection means to a fluid power actuator means located some distance from the control head. Thus, it is an object of the present invention to provide a compact control package for use with an automotive vehicle fluid power control system.

It is a further object of the present invention to provide a remotely operated fluid power control device for the climate control system of a motor vehicle.

It is yet a further object of the present invention to provide a remotely operated fluid power control device for an automotive vehicle which is insensitive to electromagnetic radiation impinging upon the vehicle or arising from other systems of the vehicle.

It is an advantage of the present remotely operated fluid power control device that only minimal connections need be provided between the selector means mounted in or upon the instrument panel of the motor vehicle and the actuator means connected between a fluid power source and various fluid power operated devices.

It is a further advantage of the present invention that the selector means or control head operable by the vehicle's driver or other passengers may be mounted at any position within the vehicle, even, for that matter, in an overhead rack, because fluid power conduits or hoses need not be attached to the selector means or control head.

It is yet a further object of the present invention to provide a remotely operated fluid power control system having the capability of placing two or more fluid power devices into two or more distinct operating modes.

SUMMARY OF THE DISCLOSURE

In accordance with a preferred embodiment of this invention, a remotely operated fluid power control system for an automotive vehicle comprises selector means for selecting one of several desired operating modes for equipment connected to the fluid power control system, and actuator means, located remotely from the selector means, for receiving electronic signals from the selector means and for connecting a fluid power source to one or more fluid powered devices in accord with said electronic signals. A signal carrying means is employed for the purpose of interconnecting the selector means and the actuator means so that electronic signals may be conveyed from the selector means to the actuator means. The selector means preferably produces electronic signals corresponding to desired operating modes in response to input from the operator of the motor vehicle. Accordingly, selector means preferably comprises manually keyable switches coupled to an appropriate switching circuit which may, for example, comprise an electronic switching circuit.

In a preferred embodiment, the actuator means of the present system preferably comprises a linearly actuatable fluid control valve operated by a motor. The motor may comprise an electric motor and preferably comprises a stepper motor. The actuator further includes a feedback means for detecting the position of the linearly actuatable valve and for reporting that position to the actuator.

In a preferred embodiment, fluid power control system of the present invention may be adapted to control the connection of a fluid power source to one or more vacuum motors. When used in a preferred embodiment as part of an automotive climate control system, the manually operable selector means will be employed for selecting a desired operating mode for the climate control system and the actuator means, which is remotely located from the selector means, will be used for selectively connecting the fluid power source to one or more vacuum motors comprising a component part of the climate control system.

In one preferred embodiment, a stepper motor operably connected to a linearly actuated valve by means of a lead screw mechanism is employed for the purpose of operating the actuator means. In yet another preferred embodiment, the stepper motor is operatively connected to the linearly actuatable valve by means of a rack and pinion gear mechanism.

Manually operable selector means in accordance with the present invention may be used for selecting a desired operating mode, from among several modes, for the climate control system of a motor vehicle, and for this purpose the selector means may be employed to provide electronic control signals including signals for operating both electrical and fluid power systems.

DESCRIPTION OF THE PREFERRED EMBODIMENTS

Figure 3:
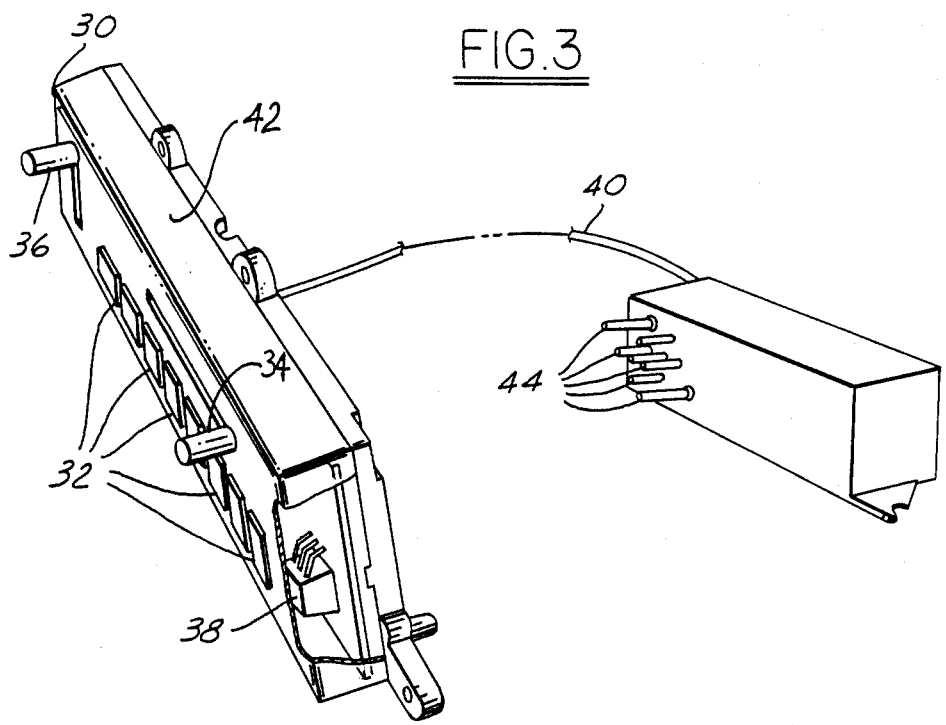
FIG. 3 is a perspective view of the control system according to the present invention in which a control head is located remotely from an actuator assembly.

As shown in FIG. 3, a preferred embodiment of the present invention includes control head 30, which functions as a selector means for selecting one of several desired operating modes for equipment connected to the present fluid power control system. Actuator assembly 42, and cable 40 are also included in the preferred embodiment shown in FIG. 3. In this embodiment, actuator assembly 42 serves as an actuator means, located remotely from control head 30, for receiving electronic signals from the control head and for connecting a fluid power source to one or more fluid powered systems in accord with signals transmitted from the control head.

Figure 1:
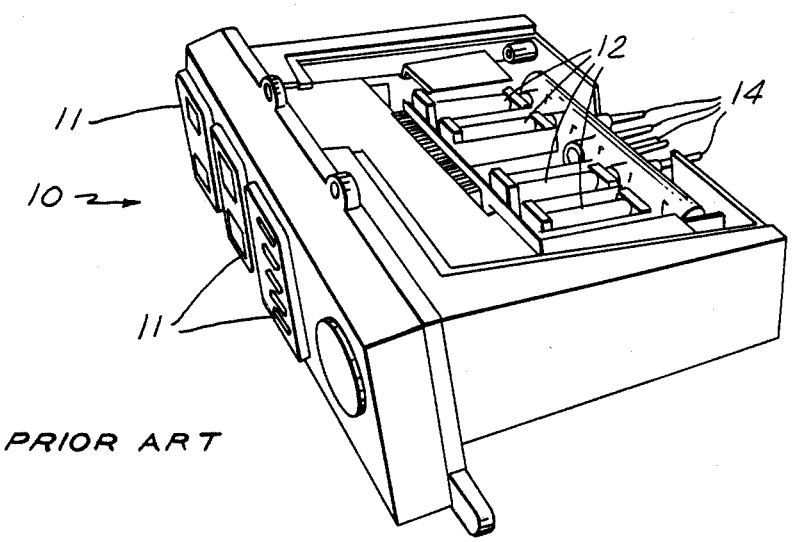
FIG. 1 is a perspective view of a prior art vacuum and electrical control assembly for an automotive air conditioning/heater assembly incorporating both switches and vacuum control solenoids in a single unit mounted in the vehicle's instrument panel.
Figure 2:
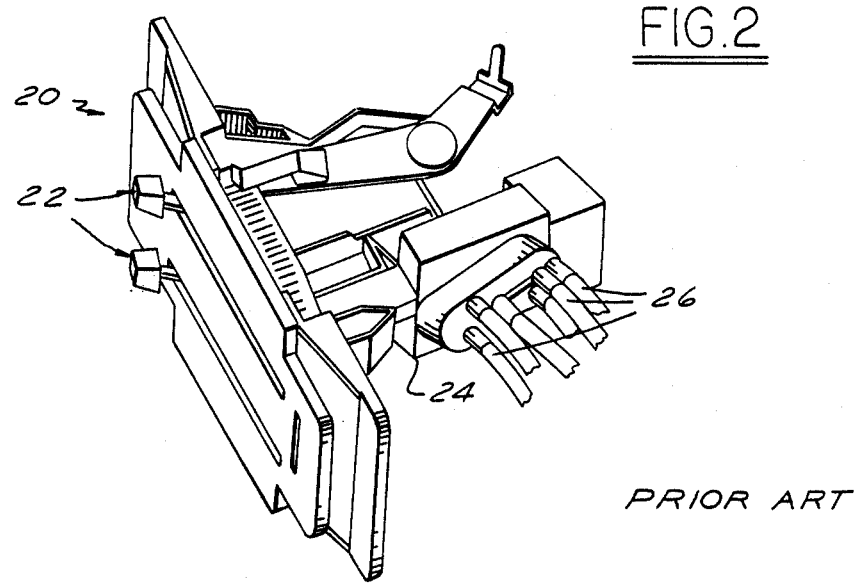
FIG. 2 is a prior art vacuum and electrical control assembly having lever operated manual controls which in turn operate electrical switches and a vacuum control valve. As before, this unit is mounted in the instrument panel of the vehicle and has several vacuum lines connected thereto.

As compared with the devices shown in FIGS. 1 and 2, control head 30 has a relatively small thickness, which allows it to be positioned anywhere within reach of the driver or other passengers of the motor vehicle without the necessity of positioning the control head within a deep panel such as an instrument panel.

Control head 30 is equipped with a variety of switches for controlling the functions and temperature of a climate control system. Accordingly, slide switches 34 and 36 are included in control head 30 as are a plurality of additional tactile switches 32. Those skilled in the art will appreciate in view of this disclosure that other types of switch devices, both manually actuated and electronic, as well as other types of switches such as voice operated switches or cathode ray tube screen pads could be employed with the present invention, FIG. 3 being merely exemplary of one embodiment of the present invention.

Control head 30 is preferably equipped with microprocessor 38 to assist actuator assembly 42 in performance of its duties. Those skilled in the art will appreciate in view of this disclosure, however, that control head 30 need not be equipped with a microprocessor inasmuch as any microprocessors needed for a control system could be contained within an actuator assembly 42, or elsewhere in the motor vehicle. Furthermore, microprocessor controls need not be utilized in the practice of the present invention. Those skilled in the art will appreciate in view of this disclosure that other types of systems employing control devices other than microprocessors are suitable for use with the present invention.

Figure 6:
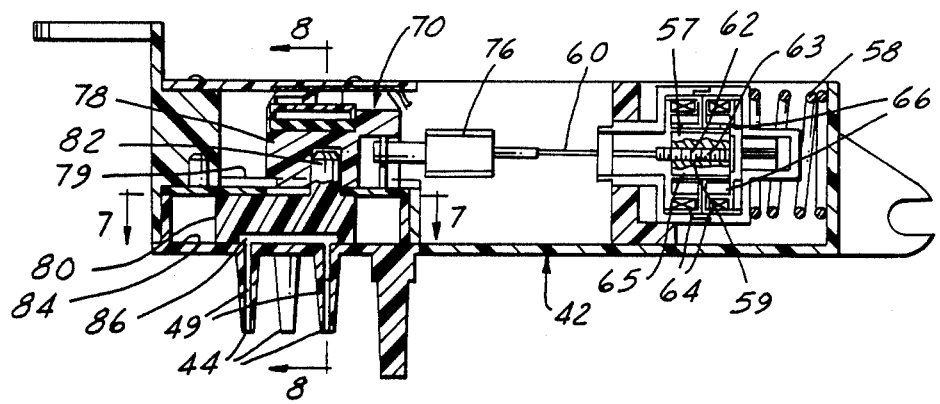
FIG. 6 is a cut away view of the actuator of FIG. 5 taken along line 6—6 of FIG. 5.
Figure 7:
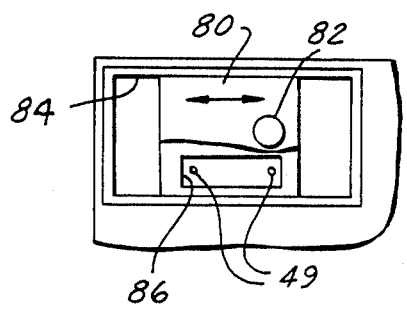
FIG. 7 is a cut away view of a portion of the actuator shown in FIG. 6 taken along line 7—7 of FIG. 6.
Figure 8:
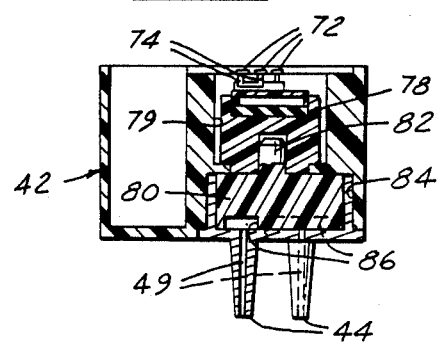
FIG. 8 is a cut away view of a portion of the actuator of FIG. 6 taken along the line 8—8 of FIG. 6.

Actuator assembly 42 has a plurality of vacuum connectors 44 which are shown in greater detail in FIGS. 6-8. Vacuum connectors 44 allow connection of a vacuum source (shown schematically as vacuum source 46 in FIG. 4) to various vacuum operated devices such as vacuum motors. Those skilled in the art will appreciate in view of this disclosure that actuator assembly 42 and control head 30 can be used with other fluid power systems such as those operating under pneumatic or hydraulic pressure.

Figure 4:
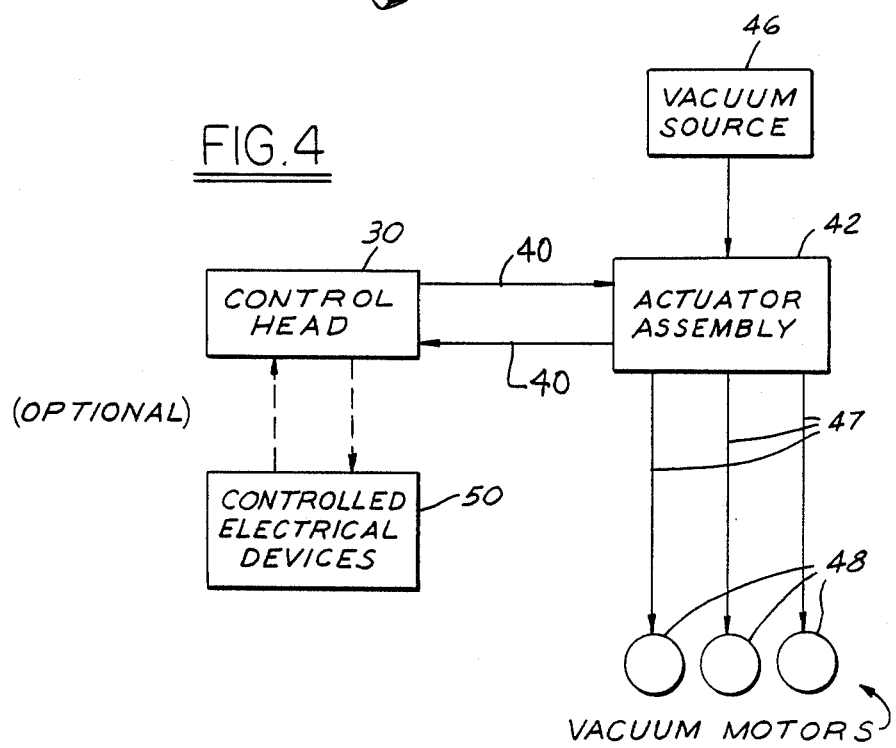
FIG. 4 is a schematic representation of a control system according to the present invention.

The interconnection of vacuum source 46 and the various components of the control system of the present invention is shown in FIG. 4. Control head 30 sends and receives signals from actuator assembly 42 via connecting cable 40. The actuator assembly controls the connection of vacuum source 46 to vacuum motors 48. Thus, upon the receipt of appropriate signals from control head 30, the actuator assembly will allow vacuum from vacuum source 46 to be applied through vacuum connectors 44 to vacuum motors 48. Those skilled in the art will appreciate that vacuum motors 48 could comprise not only familiar diaphragm type vacuum motors but also any other type of vacuum motor. Further, those skilled in the art will appreciate in view of this disclosure that a hydraulic or pneumatic power source could be substituted for vacuum source 46, and further that hydraulic or pneumatic motors or other fluid pressure operated devices could be used in lieu of vacuum motors 48.

Connecting cable 40 functions as a signal carrying means for interconnecting control head 30 and actuator assembly 42. This cable preferably comprises a multistranded electronic cable, but those skilled in the art will appreciate in view of this disclosure that a fiber optic system could be employed for the purpose of transmitting signals between control head 30 and actuator assembly 42.

Control head 30 is capable of operating certain electrical devices such as fan motors, or solenoid switches shown in block 50 of FIG. 4. This usage of control head 30 is optional.

Figure 10:
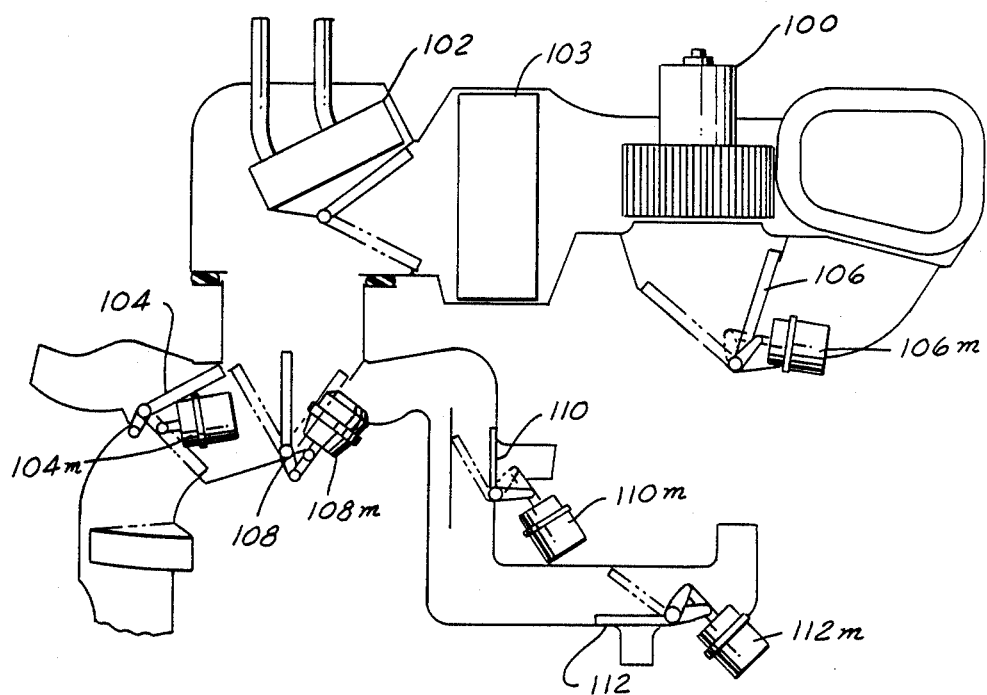
FIG. 10 is a partially schematic representation of an automotive vehicle air conditioning/heating system illustrating various vacuum motors which could be controlled by an embodiment of this invention.

FIG. 10 shows a typical automotive climate control system suitable for integration with a fluid power control system according to the present invention.

In accord with the usual convention, the climate control system depicted in FIG. 10 circulates conditioned air about the passenger compartment of the motor vehicle. Airflow is driven by a blower fan 100 which may be controlled by control head 30. Blower fan 100 pushes either fresh or recirculated air into the passenger compartment past fresh air/recirculation door 106, which is powered by vacuum motor 106*m*. Vacuum motor 106*m*, as well as all other vacuum motors shown in FIG. 10, is attached to acturator assembly 42 by means of vacuum hoses 47, as shown schematically in FIG. 4.

Air moving past fresh air/circulation door 106 moves sequentially through evaporator core 103 and heater core 102 and then past mode door 108 which is driven by vacuum motor 108*m*. Panel defrost door 104 directs conditioned air either to the instrument panel registers of the vehicle or to the defroster outlet. Mode door 108 is also capable of directing conditioned air to floor door 110 driven by vacuum motor 110*m* and seat back door 112 driven by vacuum motor 112*m*. In each case, the vacuum motor is connected to actuator assembly 42 by means of conventional hose assemblies which are well known to those skilled in the art. Those skilled in the art will appreciate that the plurality of vacuum motors needed to operate the climate control system shown in FIG. 10 must each be supplied with vacuum from a single hose. This, of course, necessitates that a bundle of hoses having a not inconsiderable size be channeled to the control assembly, in this case actuator assembly 42. Because actuator assembly 42 can be mounted in close proximity to the vacuum motors, the present invention obviates the need for bringing a hose manifold assembly up to the instrument panel, as is required by the prior art control devices shown in FIGS. 1 and 2.

Figure 9:
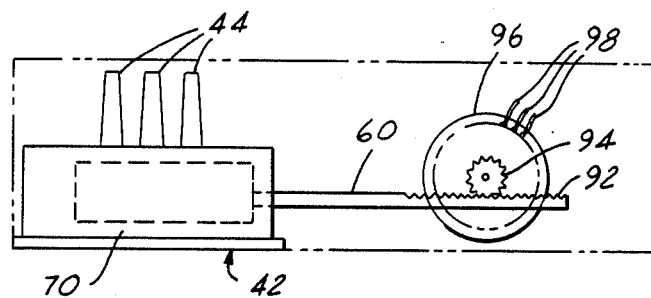
FIG. 9 is a partial schematic presentation of an alternative embodiment of the vacuum actuator shown in FIG. 3.

Details of construction of actuator assembly 42 are shown in FIGS. 5-8. An alternative embodiment of actuator assembly 42 is shown in FIG. 9. To the extent possible, reference numerals in FIG. 9 correspond to those shown in FIGS. 5-8.

Figure 5:
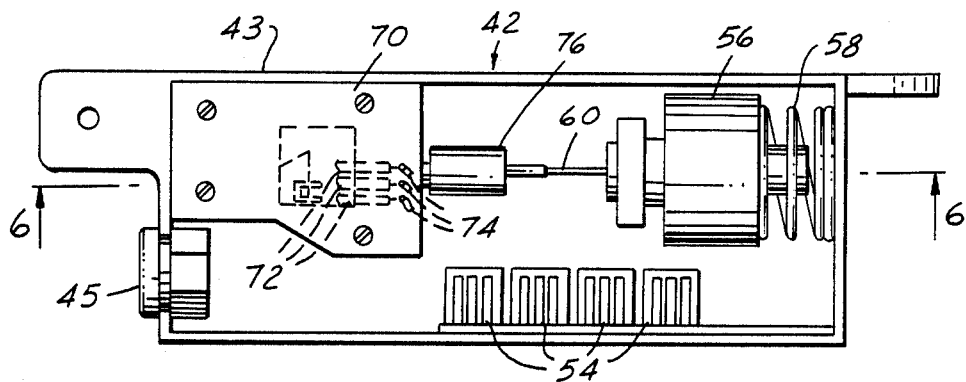
FIG. 5 is a cut-away view of the actuator assembly shown in FIG. 3.

As shown in FIG. 5, actuator assembly 42 has in view of this disclosure, as previously noted, that the an outer casing 43 within which several microprocessors 54 are mounted. Those skilled in the art will appreciate present invention could be practiced without the use of microprocessors, FIGS. 5-8 being merely exemplary of one preferred embodiment of the present invention.

The selection of various operating modes for the vacuum motors discussed in connection with FIG. 10, which motors would normally be connected to the actuator assembly, occurs when linearly actuatable valve 70 is moved to an operating position dictated by control head 30. Linearly actuatable valve 70 is driven by means of motor 56, which is connected to the linearly actuatable valve by means of coupling 76 and tie rod 60.

As previously discussed, motor 56 is connected to control head 30 via microprocessor 54, or by whatever electronic network is contained within actuator assembly 42, by means of connecting cable 40. The connecting cable enters actuator assembly 42 through wiring lead-in 45.

As shown in FIG. 6, motor 56 comprises a stepper motor having motor windings 64, and permanent magnets 66, which comprise a part of motor armature 57. Motor 56 is positioned within outer casing 43 with the assistance of compression spring 58. Usage of a stepper motor allows the linearly actuatable valve 70 of the actuator assembly to be precisely controlled because stepping motors are capable of very accurate stepping rotation and able to be very quickly reversed in rotational direction. By applying a selected number of pulses or alternating cycles to the stepping motor, the linearly actuatable valve may be moved to a predetermined position from any other known position. The use of a stepper motor to control a valve is discussed in U.S. Pat. No. 3,488,030, which is hereby incorporated by reference herein.

Lead screw 62 interacts with armature 57 of motor 56 to provide a push-pull action to linearly actuatable valve 70. Threaded portion 63, formed on the outside surface of leadscrew 62, is carried within threaded bore 59 formed at the center of armature 57. Threaded portion 63 and threaded bore 59 are meshed together, and the leadscrew is restrained such that the leadscrew will not rotate when armature 57 rotates in response to signals from control head 30. Because the leadscrew does not rotate with the armature, the rotational motion of the armature will be converted to linear motion of the leadscrew. The leadscrew has the capacity to move both left and right as viewed in FIG. 6 because the armature may be rotated in both directions.

Linear motion of the leadscrew is transmitted to linearly actuatable valve 70 by means of tie rod 60 and coupling 76, which serve not only to transmit the linear motion of the leadscrew, but which also prevent the leadscrew from rotating.

Details of construction of linearly actuatable valve 70 are shown in FIGS. 6-8. As shown in FIG. 6, coupling 76 is connected to driver 78 which reciprocates within driver guideway 79, which may be thought of as a channel within which driver 78 slides. An electrical contact set comprising stationary contact 72 mounted to the upper enclosure of driver guideway 79, and movable contact 74 mounted upon driver 78 may be utilized in connection with the other electronic components of the present system to provide position feedback to the microprocessors or other electronic systems within actuator assembly 42. This feedback discloses the location of driver 78. Those skilled in the art will appreciate in view of this disclosure that a feedback system need not be utilized in the event that the particular motor and motor control circuitry chosen to implement a device according to the present invention possess sufficient accuracy for the contemplated device.

Driver 78 is moved by motor 56 to accomplish the selective connection of a fluid power source (shown schematically as vacuum source 46 in FIG. 4), to one or more of the vacuum connectors 44. This is done by moving sled 80 to an appropriate position by means of drive pin 82, which is rigidly connected to sled 80.

As shown in FIG. 6, sled 80 reciprocates within guideway 84 in the directions shown in FIG. 7. Sled 80 is equipped with valve channels 86 which allow one or more vacuum connectors 44 to be interconnected either with each other, or with vacuum source 46 in accord with the selected desired operating mode for a climate control system or other fluid power driven system operatively connected to the actuator assembly. As shown in FIG. 8, more than one valve channel is provided within sled 80 for the purpose of interconnecting vacuum connectors 44. Further detail of sled 80, including valve channel 86 is shown in FIG. 7, which shows also the direction in which sled 80 reciprocates in response to inputs from driver 78. Finally, FIGS. 6 and 7 show ports 49 running through vacuum connectors 44. Those skilled in the art will appreciate in view of this disclosure that the present invention may be practiced by means of a rotary valve driven either by a stepper motor or by another type of motor known to those skilled in the art.

Those skilled in the art will further appreciate in view of this disclosure that the present control system is advantageously employed with automotive vehicles because connecting cable 40 need only transmit low power signals. Such would not, for example, be the case were a simple control panel to be used with solenoid valves, which require a high power, continuous signal for proper operation. Further, a solenoid system would require that individual electrical conductors be run to each solenoid; alternatively, a multiplexed, radio frequency transmission system could be employed, but such a system would be prohibitively costly and unduly complex.

A second preferred embodiment of actuator assembly 42 is shown in FIG. 9. In this embodiment, motor 96, having pinion gear 94 attached to its shaft, drives rack 92 which is connected by means of tie rod 60 to linearly actuatable valve 70. Motor control leads 98 are provided for the purpose of connecting motor 96 to the balance of the electronic circuitry of the selector means and actuator means. As before, feedback means may be provided within linearly actuatable valve 70 for detecting the position of driver 78, and sled 80 (not shown).

Various modifications and variations will no doubt occur to those skilled in the various arts to which this invention pertains. All variations which basically rely on the teachings to which this disclosure has advanced the art are properly considered within the scope of this invention as defined by the appended claims.

I claim:

1. A remotely operated fluid power control system for an automotive vehicle comprising:
   selector means for selecting one of several desired operating modes for equipment connected to said fluid power control system, said selector means comprising means for transmitting one or more electronic signals corresponding to said desired operating mode;
   actuator means, comprising a linearly actuatable fluid control valve operated by a motor, located remotely from said selector means, for receiving said electronic signals from said selector means and for connecting a fluid power source to one or more fluid powered systems in accord with said electronic signals; and
   signal carrying means for interconnecting said selector means and said actuator means, said signal carrying means comprising means for conveying said electronic signals from said selector means to said actuator means.

2. The fluid power control system according to claim 1 wherein said selector means produces said electronic signals in response to input from the operator of said motor vehicle.

3. The fluid power control system according to claim 1 wherein said selector means comprises manually keyable electronic switches coupled to an electronic switching circuit.

4. The fluid power control system according to claim 1 wherein said signal carrying means comprises an electrical cable operatively connected to said selector means and to said actuator means.

5. The fluid power control system according to claim 1 further comprising feedback means for detecting the position of said linearly actuatable valve and for reporting said position to said actuator.

6. The fluid power control system according to claim 1 wherein said motor comprises an electric motor.

7. The fluid power control system according to claim 6 wherein said electric motor comprises a stepper motor.

8. The fluid power control system according to claim 1 wherein said fluid powered systems comprise one or more vacuum motors.

9. The fluid power system according to claim 1 wherein said selector means further comprises means for directing electrical power to electrically operated systems.

10. A remotely operable fluid power control system for the climate control system of an automotive vehicle comprising:
    manually operable selector means for selecting a desired operating mode, from among several such modes, for said climate control system, said selector means comprising one or more electronic switches responsive to manual operation and an electronic network operatively connected to said switches for outputting electronic control signals corresponding to said desired operating mode, with said electronic control signals including signals for operating both electrical and fluid power systems;
    actuator means, located remotely from said selector means, for selectively connecting a source of vacuum to two or more vacuum motors operatively connected with and comprising a part of said climate control system, said actuator means comprising a linearly actuatable valve driven by an electric motor and further comprising means for receiving said electronic control signals and for conveying said electronic signals to said electric motor; and
    cable means for operatively connecting said selector means and said actuator means.

11. The fluid power control system according to claim 10 wherein said electric motor comprises a stepper motor.

12. The fluid power control system according to claim 11 wherein said stepper motor is operatively connected to said linearly actuatable valve by means of a leadscrew mechanism.

13. The fluid power control system according to claim 11 wherein said stepper motor is operatively connected to said linearly actuatable valve by means of a rack and pinion gear mechanism.

* * * * *